United States Patent [19]
Matsumoto et al.

[11] Patent Number: 6,043,568
[45] Date of Patent: Mar. 28, 2000

[54] ENGINE START CONTROLLING DEVICE

[75] Inventors: Satoru Matsumoto; Kazuhiko Hayashi, both of Toyota, Japan

[73] Assignee: Toyota Jidosha Kabushiki Kaisha, Toyota, Japan

[21] Appl. No.: 09/028,764

[22] Filed: Feb. 24, 1998

Related U.S. Application Data

[63] Continuation of application No. PCT/JP97/01636, May 15, 1997.

[30]     Foreign Application Priority Data

Jun. 25, 1996  [JP]  Japan ................................. 8-164309

[51] Int. Cl.⁷ ................................................. B60R 25/04
[52] U.S. Cl. .......................................... 307/10.5; 180/287
[58] Field of Search ................................. 307/10.1–10.6; 180/287; 701/1, 36, 29; 340/429.5, 426, 825.3–825.32, 825.34, 825.44, 825.54, 825.69, 825.72, 430

[56]                 References Cited

U.S. PATENT DOCUMENTS

| | | | |
|---|---|---|---|
| 5,606,306 | 2/1997 | Mutoh et al. | 307/10.5 |
| 5,646,456 | 7/1997 | Udoh et al. | 307/10.5 |
| 5,686,883 | 11/1997 | Mutoh et al. | 307/10.2 |
| 5,763,958 | 6/1998 | Yamamoto et al. | 307/10.5 |
| 5,796,178 | 8/1998 | Onuma | 307/10.2 |
| 5,861,816 | 1/1999 | Funakoshi et al. | 307/10.5 |

FOREIGN PATENT DOCUMENTS

| | | |
|---|---|---|
| 8-091176 | 4/1996 | Japan . |
| 8-133016 | 5/1996 | Japan . |
| 8-150899 | 6/1996 | Japan . |
| 8-150900 | 6/1996 | Japan . |
| 8-150902 | 6/1996 | Japan . |
| 8-150903 | 6/1996 | Japan . |
| 8-169303 | 7/1996 | Japan . |
| 8-185580 | 7/1996 | Japan . |
| 9-058414 | 3/1997 | Japan . |
| 9-175330 | 7/1997 | Japan . |

OTHER PUBLICATIONS

Automobile Technique Application Publication No. 95603, Association of Japan Automobile Industry, Intellectual Property Section, published on Dec. 1, 1995.

*Primary Examiner*—Richard T. Elms
*Attorney, Agent, or Firm*—Pillsbury Madison & Sutro, LLP

[57]              ABSTRACT

An engine start controlling device prevents an engine from starting with exchanged ECUs. In a non-volatile memory 20f of an engine control ECU 20, information regarding whether or not an immobilizer function is used is stored, while a judging unit 20e interprets signals from input terminals 40-1–40-n and judges whether or not an immobilizer function is available. Only when the signals from the input terminals 40-1–40-n show immobilizer function unavailableness does the ECU operate as an ECU without the immobilizer function.

3 Claims, 4 Drawing Sheets

GENERAL CONFIGURATION

ENGINE START CONTROLLING DEVICE

This is a continuation of International Appln. No. PCT/JP97/01636 filed May 15, 1997 which designated the U.S.

FIELD OF THE INVENTION

The present invention relates to an engine start controlling device. More specifically, the present invention relates to a device for aborting engine start when an illegal engine starting operation is carried out.

BACKGROUND OF THE INVENTION

Automobile and the like commonly have locking devices in their doors or other areas which can be unlocked only with a proper key, and an engine that can be started using a proper ignition key. In this manner, attempts are made to prevent vehicle theft. For more secure theft prevention, further theft prevention mechanisms have been proposed and are being implemented.

For example, in Automobile Technique Application Publications No. 95603 (Association of Japan Automobile Industry, Intellectual Property Section, published on Dec. 1, 1995), a vehicle theft preventing device for prohibiting engine start when an improper ignition key is used is disclosed.

In this vehicle theft preventing device, a transponder for transmitting a key code is installed in an ignition key. This transponder receives power from a radio wave transmitted from an antenna set in a key cylinder, and transmits the key code stored therein. An immobilizer ECU (Electronic Control Unit) is connected to the antenna in the key cylinder, and the immobilizer ECU judges whether or not the key code sent from the transponder is correct. The immobilizer ECU has a connection to an engine ECU which controls engine ignition and fuel injection. The immobilizer ECU notifies the engine ECU of whether or not the correct key code has been received. When the immobilizer ECU has not received, the correct key code, the engine ECU prohibits fuel injection and engine ignition, and executes engine stopping control. In this manner, engine start and vehicle motion can be prevented when an improper key is used to start the engine. On this occasion, the engine ECU starts the engine as usual when ignition is switched ON by an operation using an ignition key, and stopped the engine after receiving a signal from the immobilizer ECU.

The immobilizer ECU only controls the engine ECU. Therefore, it is possible to incorporate the function of an immobilizer ECU in an engine ECU, and the function of the immobilizer ECU can be achieved by a single ECU. On the other hand, the immobilizer function is not presently installed in all vehicles, and a large number of vehicles do not have this function. However, as an ECU is created as a semiconductor integrated circuit, it has been desired that ECUs be generalized as much as possible. Therefore, it is considered to be preferable that the immobilizer function be installed in all engine ECUs and that the availableness or unavailableness of this function can be set. In this manner, generality of an ECU is improved while individual vehicle requests can be dealt with.

However, in the ECU whose immobilizer function availableness can be set, the immobilizer function is not demonstrated when the setting is changed. Therefore, the setting should be unchangeable. Nevertheless, even when the setting cannot be changed, an engine can be started if an ECU with the immobilizer function is detached from a vehicle and an ECU from a vehicle without the immobilizer function is attached in its place. Furthermore, in a brand-new ECU (a virgin ECU), information regarding availableness or unavailableness of the immobilizer function is not written. It is therefore possible for an engine to be started if such a virgin ECU is attached to a vehicle instead of the vehicle's original ECU with the immobilizer function.

The present invention has been created to solve the above problems. The present invention is an engine start controlling device which stores information regarding availableness or unavailableness of the immobilizer function, and an object of the present invention is to provide an engine start controlling device which can achieve the appropriate immobilizer function.

DISCLOSURE OF THE INVENTION

One aspect of the present invention is an engine start controlling device comprising receiving means for receiving setting information regarding immobilizer function unavailableness, judging means for interpreting and judging the information received by the receiving means and for judging whether or not an engine starting operation is appropriate, and immobilizer function availableness or unavailableness information storing means for storing information regarding whether or not an immobilizer function which controls the engine start is used, wherein the engine start permission or prohibition is controlled based on both the information stored in the immobilizer function availableness or unavailableness information storing means and the setting information regarding immobilizer function unavailableness received by the receiving means.

As described above, the present invention comprises the immobilizer function availableness or unavailableness information storing means and the receiving means. Based on the setting information regarding immobilizer function unavailableness received by the receiving means and the information stored in the immobilizer function availableness or unavailableness information storing means, it is judged whether or not the immobilizer function is used. Therefore, even if an engine start controlling device detached from a vehicle without an immobilizer is attached to a vehicle having an immobilizer, the engine start controlling device does not function as an engine start controlling device without an immobilizer, unless the information regarding setting of the immobilizer function input to the receiving means shows "without an immobilizer". As a result, an engine start prohibiting operation becomes more preferable.

Furthermore, the present invention is characterized in that the immobilizer function availableness or unavailableness information storing means store information representing immobilizer unavailableness only when the receiving means have received setting information regarding immobilizer function unavailableness.

As described above, only when the setting information is set to predetermined information, the immobilizer function availableness or unavailableness information storing means store the information representing immobilizer unavailableness. Therefore, even when a virgin engine start controlling device is used, it is not easy to set the virgin device to information representing immobilizer function unavailableness, and a more secure engine start prohibiting operation can be achieved.

Moreover, another aspect of the present invention is an engine start controlling device comprising means for receiving setting information regarding immobilizer function unavailableness input from an external source, means for interpreting and judging the setting information and for judging whether or not an engine starting operation is appropriate, means for storing information regarding whether or not an immobilizer function for controlling engine start is used based on the judgment result, and means for controlling permission or prohibition of the engine start based on both the information regarding whether or not the immobilizer function is used and the setting information regarding immobilizer function unavailableness input from the external source.

As described above, the present invention judges whether or not an immobilizer function should be used based on both the information regarding whether or not the immobilizer function is used and the setting information regarding immobilizer function unavailableness input from the external source. Therefore, a more preferable engine start prohibiting operation can be achieved.

PREFERRED EMBODIMENT FOR IMPLEMENTING THE INVENTION

Hereinafter, a preferred embodiment of the present invention (hereinafter called the embodiment) will be explained using the accompanying drawings.

[The Entire System Configuration]

Figure 1:
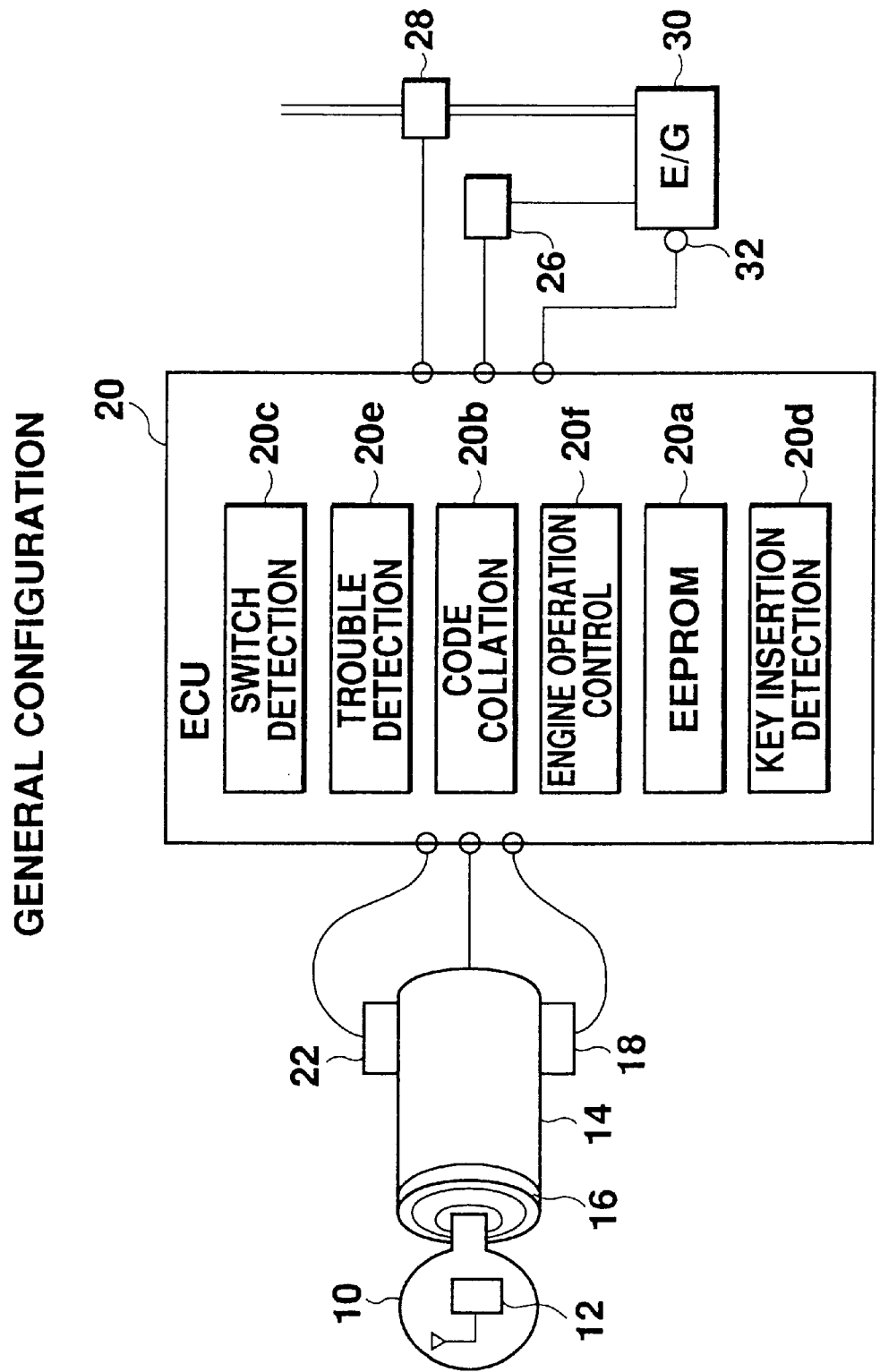
FIG. 1 is a block diagram showing complete system of the present invention.

FIG. 1 shows an entire system of a vehicle theft prevention device related to the embodiment of the present invention. An ignition key 10, which is also used for locking and unlocking a door of a vehicle, contains a transponder 12. The transponder 12 comprises an antenna, a power circuit, a storing unit, a reading circuit, a transmitting circuit, and the like. When the transponder 12 receives a predetermined radio wave from an external source, the radio wave is received by the antenna and sent to the power circuit. The power circuit obtains power from the received radio wave and supplies that power to each circuit. The transponder 12 then reads a key code stored in the storing unit and transmits the code from the antenna via the transmitting circuit.

A key cylinder 14 can turn with the ignition key 10 in a predetermined shape (or predetermined magnetization or the like). By a turning position of the key cylinder 14, a variety of switches such as an accessory switch, an ignition switch, and a starter switch are operated in their usual manner. In other words, the accessory switch controls power to accessory equipment, the ignition switch controls power to equipment necessary for vehicle motion such as an ignition plug, and the starter switch controls power to the starter motor. The key cylinder can only turn when the tip of the inserted ignition key 10 matches with the cylinder.

Around the front of the key cylinder 14 (the side in which the ignition key 10 is inserted), an antenna 16 is provided. From this antenna 16, a predetermined radio wave is transmitted to the transponder 12, and a radio wave from the transponder 12 is received by the antenna 16. The antenna 16 is connected to an engine control ECU 20 via an amplifier 18 for amplifying the received radio wave. The engine control ECU 20 has been created as a single semiconductor integrated circuit.

Inside the engine control ECU 20 is stored a reference code corresponding to the key code of the ignition key 10. In this particular example, an EEPROM 20a stores the reference code. A code comparing unit 20b judges whether or not the key code transmitted from the transponder 12 via the antenna 16 coincides with the reference code.

Information sent from the key cylinder 14 regarding an ON or OFF state of the switches is provided to the engine control ECU 20, and a switch detecting unit 20c detects the state of each switch. In other words, the switch detecting unit 20c recognizes the ON or OFF state of the accessory switch, the ignition switch, and the starter switch.

The engine control ECU 20 comprises an operation controlling unit 20d which controls an ignition (plug ignition) controlling unit 26 and a fuel injection controlling unit 28. The ignition controlling unit 26 and the fuel injection controlling unit 28 are connected to an engine 30 and control ignition of the engine and fuel injection to the engine.

In other words, using the signal from the switch detecting unit 20c, the operation controlling unit 20d of the engine control ECU 20 detects that ignition has been switched on by turn of the key cylinder 14. In response to this detection, the operation controlling unit 20d enables a power supply to the ignition plug and fuel injection to the engine. In response to revolving of the engine 30 by turning of the starter motor, the operation controlling unit 20d carries out predetermined ignition and fuel injection operations which are continuously controlled after the engine 30 is started. The engine control ECU 20 also comprises a transceiver circuit or the like for communication via the antenna 16, not shown.

The engine control ECU 20 transmits a predetermined radio wave to the antenna 16 when the ignition key is inserted, and waits for reception of a signal from the antenna 16. When the engine control ECU 20 receives the signal from the transponder 12 via the antenna 16, it judges whether or not the key code sent from the transponder 12 coincides with the reference code stored in the EEPROM 20a. When a judgment result showing a perfect match is obtained, the engine control ECU 20 permits driving the engine thereafter.

In this particular embodiment, the engine control ECU 20 comprises input terminals 40-1–40-n to which signals from n signal lines (setting information) are input. The n signal lines respectively comprise switches 42-1–42-n. Based on ON or OFF setting of these switches, potentials of the input terminals 40-1–40-n are controlled. On the other hand, a judging unit 20e is connected to these input terminals 40-1–40-n. The judging unit 20e interprets and judges the setting information input from the input terminals 40-1–40-n.

The engine control ECU 20 comprises a non-volatile memory 20f which stores information regarding immobilizer function availableness or unavailableness. The non-volatile memory 20f may be placed as a part of the EEPROM 20a.

The engine control ECU 20 then controls engine start based on the signals from the input terminals 40-1–40-n and the information stored in the non-volatile memory 20f.

[Operations]

Figure 2:
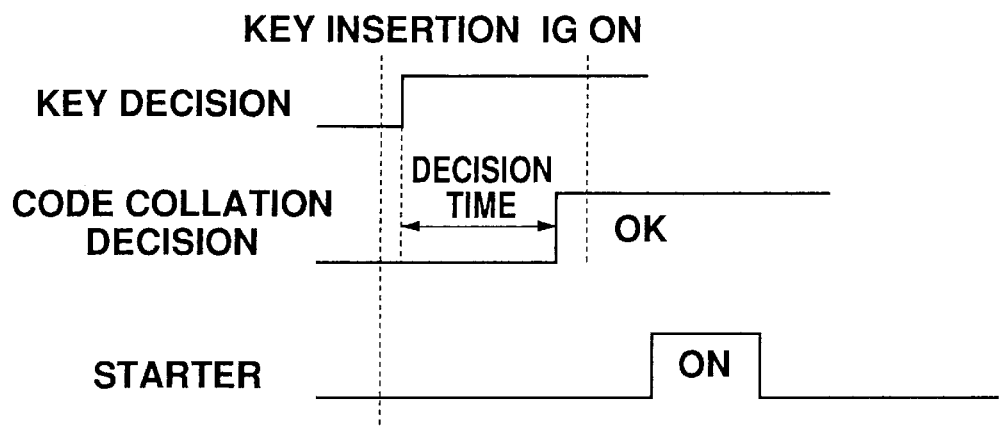
FIG. 2 is a flowchart showing operations in an embodiment of the present invention.
Figure 3:
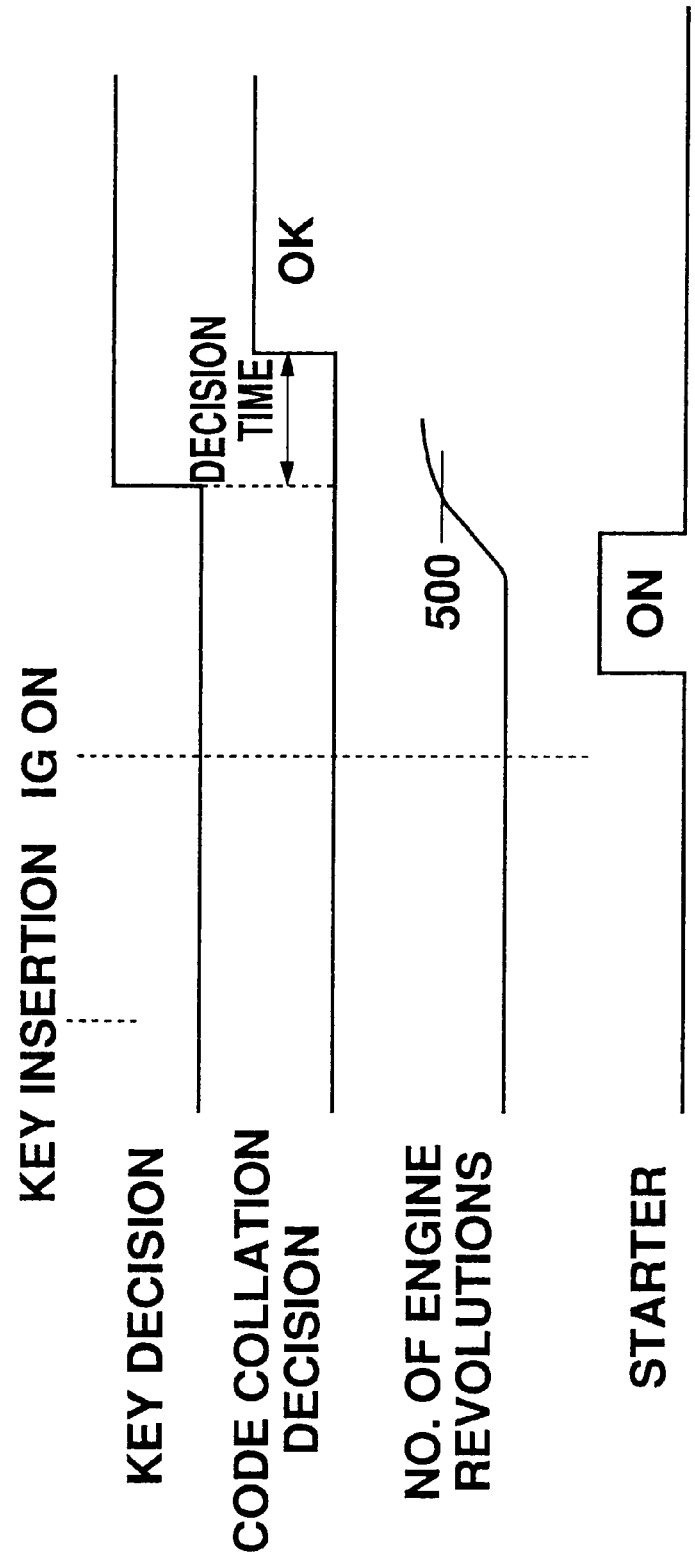
Figure 4:
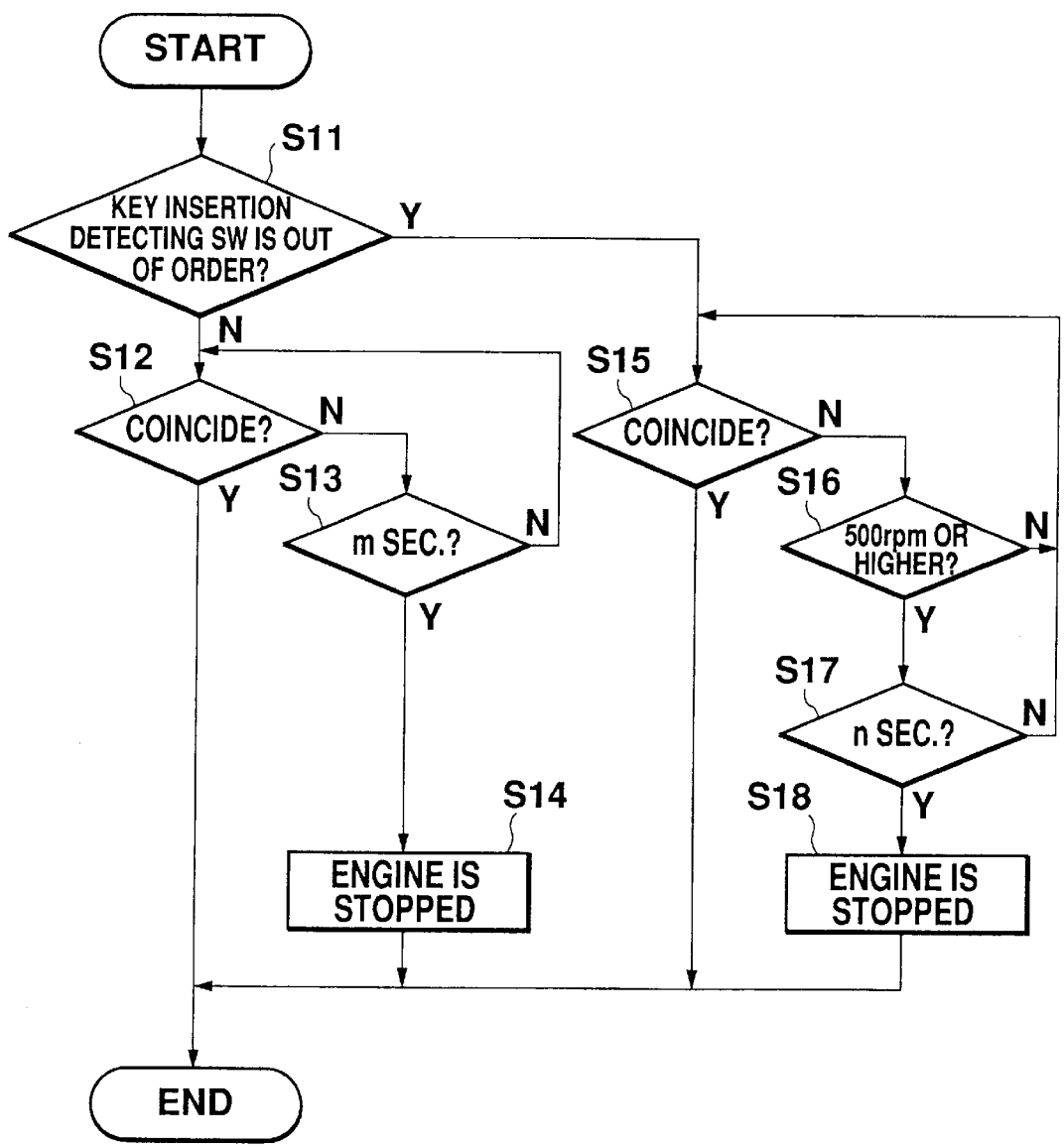

Operations of the engine control ECU 20 in accordance with the present embodiment will be explained referring to the flowchart in FIG. 2.

When the engine control ECU 20 is powered on by an operation using the ignition key 10, it waits for reception of the key code, and judges whether or not the key code has been transmitted from the transponder 12 within a predetermined time (S11). If the key code has been transmitted within that predetermined time, the engine control ECU carries out the key code comparison processing as described above.

On the other hand, if the key code was not received, it is judged whether or not the engine control ECU 20 is a virgin (a brand-new) ECU (S12). This judgment may be based on a fact that the non-volatile memory 20f does not have the information regarding immobilizer function availableness or unavailableness, or alternatively, on other data. In S12, if the ECU is judged not to be a virgin ECU, it is judged whether or not the immobilizer function should be used, based on the information stored in the non-volatile memory 20f (S13). If it is judged that the immobilizer function is available, the engine control ECU stops the engine. In this manner, engine stop can be executed when the key code is not transmitted.

If the ECU is judged to be a virgin ECU in S12, and if the immobilizer function is judged not to be available in the ECU in S13, it is judged whether or not the engine control ECU 20 should be operated as the ECU without the immobilizer function (S14). This judgment is carried out based on whether or not the setting information in the input terminals 40-1–40-n is in a predetermined state, which can be a fixed state. However, it is preferable that the predetermined state varies in each vehicle. For example, it is preferable that the predetermined state be determined by the time of manufacturing of the engine control ECU 20 or by a lot number or a product serial number determined at the time of the manufacturing.

Therefore, only when the ON-OFF states of the switches 42-1–42-n set on the signal lines to the input terminals 40-1–40-n are in a predetermined state, the engine control ECU is permitted to operate as an engine ECU without the immobilizer function. In the above example, the setting information is created by grounding some of the input terminals 40-1–40-n. However, the setting information may also be created by judging a voltage level of an analogue signal in a predetermined voltage and using the judging unit 20e. The engine control ECU 20 operates by receiving a variety of signals. Therefore, the setting information may be supplied to the engine control ECU 20 by multiplying the setting information on the signals.

If the judgment result in S14 is N, that is, the setting information from the input terminals 40-1–40-n is not the information showing unavailableness of the immobilizer function, the engine is prohibited from starting. On the other hand, if the setting information from the input terminals 40-1–40-n shows unavailableness of the immobilizer function, a judgment of the immobilizer function unavailableness is carried out and engine start is permitted (S15). On this occasion, when the ECU is a virgin 20 ECU, information showing the immobilizer function unavailableness is stored in the non-volatile memory 20f and the ECU serves as an ECU without the immobilizer function.

As described above, in this embodiment, it is confirmed in S14 whether or not the ECU can operate as the ECU without the immobilizer function, by examining the setting information from the input terminals 40-1–40-n. Therefore, even when the engine control ECU is a virgin ECU, or it has been set as an ECU without the immobilizer function, the ECU does not serve as the ECU without the immobilizer function unless the setting information from the input terminals 40-1–40-n shows immobilizer function unavailableness. As a result, even when a one-chip ECU with the immobilizer function is exchanged to a one-chip ECU of the same kind without the immobilizer function, engine start will not be permitted. Furthermore, when a virgin ECU is unjustly used, the ECU will be prevented from operating as an ECU without the immobilizer function.

[Probable Application on Industry]

As described above, according to the present invention, permission or prohibition of engine start is controlled by information stored in the engine control ECU as well as the setting information from the input terminals. Therefore, an engine start prohibiting operation becomes more preferable and an appropriate immobilizer function can be executed.

What is claimed is:

1. An engine start controlling device comprising:

receiving means for receiving setting information regarding unavailableness of an immobilizer function, the information being input from an external source;

judging means for interpreting and judging the setting information received by the receiving means and for judging whether or not an engine starting operation is appropriate; and immobilizer function availableness or unavailableness information storing means for storing information regarding whether or not an immobilizer function for controlling engine start is used, based on a result of the judgment by the judging means; wherein permission or prohibition of engine start is controlled based on both the information stored in the immobilizer function availableness or unavailableness information storing means and the setting information received by the receiving means.

2. The engine start controlling device according to claim 1 wherein the immobilizer function availableness or unavailableness information storing means stores information showing immobilizer function unavailableness only when the receiving means have received setting information regarding unavailableness of the immobilizer function.

3. An engine start controlling device comprising:

means for receiving setting information regarding unavailableness of an immobilizer function, the information being input from an external source;

means for interpreting and judging the setting information and for judging whether or not an engine starting operation is appropriate;

means for storing information regarding whether or not an immobilizer function for controlling engine start is used, based on a result of the judgment; and means for controlling permission or prohibition of the engine start based on both the information regarding whether or not the immobilizer function is used and the setting information input from the external source regarding the immobilizer function unavailableness.

* * * * *